(12) United States Patent
Gamas-Castellanos et al.

(10) Patent No.: US 9,446,369 B2
(45) Date of Patent: *Sep. 20, 2016

(54) APPARATUSES FOR STRIPPING GASEOUS HYDROCARBONS FROM PARTICULATE MATERIAL AND PROCESSES FOR THE SAME

(71) Applicant: UOP LLC, Des Plaines, IL (US)

(72) Inventors: Erick D. Gamas-Castellanos, Houston, TX (US); Mitchell J. Kowalczyk, Brookfield, IL (US)

(73) Assignee: UOP LLC, Des Plaines, IL (US)

( * ) Notice: Subject to any disclaimer, the term of this patent is extended or adjusted under 35 U.S.C. 154(b) by 57 days.

This patent is subject to a terminal disclaimer.

(21) Appl. No.: 14/597,736

(22) Filed: Jan. 15, 2015

(65) Prior Publication Data

US 2015/0126356 A1  May 7, 2015

Related U.S. Application Data

(63) Continuation of application No. 13/339,025, filed on Dec. 28, 2011, now Pat. No. 8,936,757.

(51) Int. Cl.
| | | |
|---|---|---|
| *B01J 19/00* | (2006.01) | |
| *B01J 38/72* | (2006.01) | |
| *B01J 8/34* | (2006.01) | |
| *B01J 8/26* | (2006.01) | |
| *B01J 38/02* | (2006.01) | |
| *B01J 38/12* | (2006.01) | |
| *C10G 11/18* | (2006.01) | |
| *B01J 19/32* | (2006.01) | |
| *B01J 38/06* | (2006.01) | |
| *B01D 12/00* | (2006.01) | |
| *B01J 38/04* | (2006.01) | |

(52) U.S. Cl.
CPC .................. *B01J 8/34* (2013.01); *B01D 12/00* (2013.01); *B01J 8/26* (2013.01); *B01J 19/32* (2013.01); *B01J 38/02* (2013.01); *B01J 38/04* (2013.01); *B01J 38/06* (2013.01); *B01J 38/12* (2013.01); *C10G 11/18* (2013.01); *B01J 2208/00752* (2013.01); *B01J 2219/3221* (2013.01); *B01J 2219/32241* (2013.01)

(58) Field of Classification Search
CPC ................................ B01J 38/72; B01J 19/00
USPC ........ 422/144, 145, 147; 570/159, 237, 155, 570/136, 190, 216
See application file for complete search history.

(56) References Cited

U.S. PATENT DOCUMENTS

2005/0205467 A1\* 9/2005 Hedrick et al. ............... 208/150

\* cited by examiner

*Primary Examiner* — Huy-Tram Nguyen
(74) *Attorney, Agent, or Firm* — James C. Paschall

(57) ABSTRACT

Apparatuses and processes are provided for stripping gaseous hydrocarbons from particulate material. One process comprises the step of contacting particles containing hydrocarbons with a stripping vapor in countercurrent flow to remove at least a portion of the hydrocarbons with the stripping vapor to form stripped particles. Contacting the particles includes advancing the particles down a sloping element of a structured packing toward a reinforcing rod that is disposed along a lower channel portion of the sloping element. The particles are advanced over the reinforcing rod. The particles are contacted with the stripping vapor that is rising up adjacent to the lower channel portion.

15 Claims, 4 Drawing Sheets though the catalyst. The efficiency of catalyst stripping is typically increased by employing structured packing that includes vertically spaced baffles to cascade the catalyst from side to side as it moves down the catalyst stripper and countercurrently contacts a stripping medium. Moving the catalyst from side to side increases both the residence time and contact between the catalyst and the stripping medium so that more hydrocarbons are stripped from the catalyst. In such structured packing, the catalyst and stripping medium travel a labyrinthine path through a series of baffles located to affect two-phase mixing. Catalyst and gas contact is increased by this arrangement that leaves no open vertical path for single phase flow through the stripping apparatus. The structured packing includes rows of baffles that are typically secured in position with reinforcing rods some of which are secured to the lower sections of the baffles.

APPARATUSES FOR STRIPPING GASEOUS HYDROCARBONS FROM PARTICULATE MATERIAL AND PROCESSES FOR THE SAME

CROSS-REFERENCE TO RELATED APPLICATION

This application is a Continuation of application Ser. No. 13/339,025, now U.S. Pat. No. 8,936,757, filed Dec. 28, 2011, the contents of which are hereby incorporated by reference in its entirely.

TECHNICAL FIELD

The present invention relates generally to apparatuses and processes for stripping, and more particularly relates to apparatuses and processes for stripping gaseous hydrocarbons from particulate material, such as catalyst particles and the like.

BACKGROUND

A variety of processes contact finely divided particulate material with a hydrocarbon feedstock under conditions to fluidize the particulate material to affect transport of the particulate material to different stages of the process. Such processes commonly employ a subsequent stripping operation to remove at least some of the gaseous hydrocarbons that have become adsorbed and/or entrained within the particulate material. One example is fluid catalytic cracking (FCC) of hydrocarbons. FCC of hydrocarbons is a primary refinery process for the production of gasoline and light hydrocarbon products from heavy hydrocarbon charge stocks such as vacuum gas oils or residual feedstock.

The basic equipment utilized in the fluid catalytic cracking of hydrocarbons includes a reactor, a regenerator, and a catalyst stripper. The reactor includes a reaction or contact zone and a separation zone. In the contact zone, a hydrocarbon feed material, e.g., oil, is contacted with a catalyst made up of a finely divided or particulate solid material. The catalyst for the reaction is transported like a fluid by passing gas or vapor through the catalyst at sufficient velocity to produce a desired regime of fluid transport. Contact of the oil with the fluidized particulate material promotes the cracking reactions. As the cracking reactions proceeds, substantial amounts of carbonaceous material, called coke, is deposited on and deactivates the catalyst (commonly referred to herein as "spent catalyst"). In the separation zone, product vapors from the cracking reaction are separated from the catalyst. Further product separation takes place in the catalyst stripper that receives catalyst from the separation zone and removes trapped gaseous hydrocarbons from the catalyst by countercurrent contact with an inert stripping medium. The catalyst is circulated to the regenerator section that includes a regeneration zone where high temperature regeneration of the catalyst occurs by burning coke from the catalyst in the presence of oxygen. Spent catalyst is continually removed from the reaction zone and replaced by essentially coke-free catalyst from the regeneration zone.

A common method of stripping catalyst in the FCC of hydrocarbons or other similar processes includes passing an inert stripping gas, such as or typically steam, countercurrent through a flowing stream of catalyst. Such steam stripping operations, with varying degrees of efficiency, remove the hydrocarbon vapors that are adsorbed on and/or entrained Accordingly, it is desirable to provide apparatuses and processes for stripping gaseous hydrocarbons from particulate material that provide high stripping efficiency. Furthermore, other desirable features and characteristics of the present invention will become apparent from the subsequent detailed description and the appended claims, taken in conjunction with the accompanying drawings and this background.

BRIEF SUMMARY

Apparatuses and processes for stripping gaseous hydrocarbons from particulate material are provided herein. In accordance with an exemplary embodiment, an apparatus for stripping gaseous hydrocarbons from particulate material comprises a structured packing configured for passage of a stripping vapor and particles that contain hydrocarbons in countercurrent contacting flow to remove at least a portion of the hydrocarbons with the stripping vapor to form stripped particles. The structured packing comprises a first formed strip comprising a sloping element that has a lower channel portion and an inclined sheet portion that extends generally upward from the lower channel portion. A reinforcing rod is disposed along the lower channel portion.

In accordance with another exemplary embodiment, an apparatus for stripping gaseous hydrocarbons from particulate material is provided. The apparatus comprises a vessel that contains a stripping section. An entrance is for advancing particles that contain hydrocarbons to the stripping section. A distributor is for uniformly communicating a stripping vapor to the stripping section. A structured packing is disposed in the stripping section and is configured for passage of the particles and the stripping vapor in countercurrent contacting flow to remove at least a portion of the hydrocarbons with the stripping vapor to form stripped particles. The structured packing comprises a first formed strip comprising first alternating segments that define a first vertical element that has a first upper portion and a first lower portion. The first alternating segments each have a first upper sloping element and a first lower sloping element extending from the first upper portion and the first lower portion, respectively, in opposite directions and at an incline to the first vertical element. The first upper sloping elements and independently the first lower sloping elements of the first alternating segments extend in alternating directions that are angular to each other. The first upper sloping elements each have a first lower channel portion and a first inclined sheet portion that extends generally upward from the first lower channel portion. A first upper reinforcing rod overlies the first upper portion of the first vertical element and is disposed along the first channel portions. A first lower reinforcing rod is disposed adjacent to the first lower sloping elements of alternate segments of the first alternating segments distally from the first vertical element. A port is for receiving the stripped particles.

In accordance with another exemplary embodiment, a process for stripping gaseous hydrocarbons from particulate material is provided. The process comprises the step of contacting particles containing hydrocarbons with a stripping vapor in countercurrent flow to remove at least a portion of the hydrocarbons with the stripping vapor to form stripped particles. Contacting the particles includes advancing the particles down a sloping element of a structured packing toward a reinforcing rod that is disposed along a lower channel portion of the sloping element. The particles are advanced over the reinforcing rod. The particles are contacted with the stripping vapor that is rising up adjacent to the lower channel portion.

BRIEF DESCRIPTION OF THE DRAWINGS

The present invention will hereinafter be described in conjunction with the following drawing figures, wherein like numerals denote like elements, and wherein.

DETAILED DESCRIPTION

The following Detailed Description is merely exemplary in nature and is not intended to limit the invention or the application and uses of the invention. Furthermore, there is no intention to be bound by any theory presented in the preceding background or the following detailed description.

Various embodiments contemplated herein relate to apparatuses and processes for stripping gaseous hydrocarbons from particulate material. Unlike the prior art, the exemplary embodiments taught herein provide a structured packing that is disposed in a stripping section of a vessel. The structured packing is configured for passage of particles that contain hydrocarbons and a stripping vapor in countercurrent contacting flow to remove at least a portion of the hydrocarbons with the stripping vapor to form stripped particles. The structured packing comprises a plurality of sloping elements that are configured to move the particles side to side as they advance through the structured packing to improve contact between the particles and the stripping vapor. Each of the sloping elements has a lower channel portion and an inclined sheet portion that extends generally upward from the lower channel portions. The sloping elements are coupled to a reinforcing rod(s) along the lower channel portions. As the particles descend through the structured packing, the particles contact and advance down the sloping elements towards the reinforcing rod(s). The reinforcing rod(s), which is disposed through the channel spaces of the lower channel portions, is recessed relative to the inclined sheet portion(s) of the sloping elements such that the particles readily pass over the reinforcing rod(s). Stripping vapor that is rising up adjacent to the lower channel portions contacts the particles in countercurrent flow to remove at least a portion of the gaseous hydrocarbons.

Figure 1:
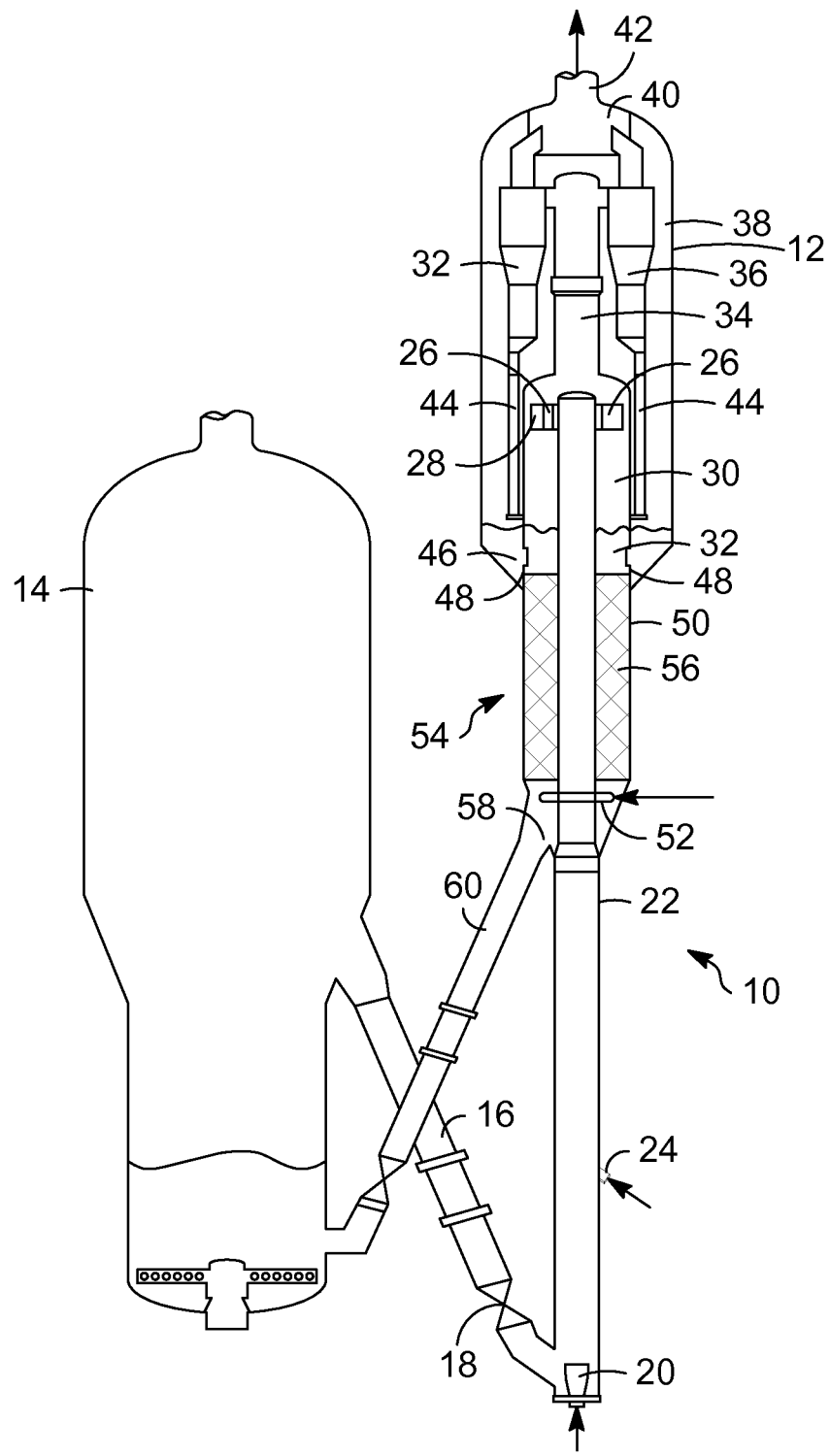
FIG. 1 is a sectional side view of a FCC unit including a stripper section in accordance with an exemplary embodiment.

Referring to FIG. 1, a sectional side view of a FCC unit 10 to which an apparatus and process for stripping gaseous hydrocarbons from particulate material in accordance with exemplary embodiments contemplated herein may be applied. The FCC unit 10 is configured for fluid catalytic cracking of hydrocarbons. The FCC unit 10 comprises a reactor 12 and a riser 22 that receive a FCC feedstock, e.g., oil. A regenerator 14 is in fluid communication with the reactor 12 to receive spent catalyst. The feedstock is cracked to form a product effluent containing hydrocarbons ranging from methane through relatively high boiling point materials along with hydrogen and hydrogen sulfide. In an exemplary embodiment, the feedstock is cracked at cracking conditions that include a temperature of from about 450 to about 600° C., and a pressure of from about 65 to about 500 kPa(g). During the cracking reaction, a carbonaceous by-product is deposited on the circulating catalyst. The carbonaceous by-product, termed "coke," is continuously burned off the spent catalyst in the regenerator 14. In an exemplary embodiment, the regenerator 14 operates at regeneration conditions that include a temperature of from about 600 to about 800° C., and a pressure of from about 35 to about 500 kPa(g).

As illustrated, a regenerated catalyst standpipe 16 transfers catalyst from the regenerator 14 at a rate regulated by a slide valve 18. A fluidization medium from a nozzle 20 transports the catalyst upwardly through a lower portion of a riser 22 (e.g. "reaction zone") at a relatively high density until a feed injection nozzle(s) 24 injects the feedstock across a flowing stream of the catalyst particles. In an exemplary embodiment, the FCC unit 10 is configured to operate with a catalyst to oil (C/O) ratio, based on the weight of catalyst and feedstock entering the bottom of the riser 22, of from about 4:1 to about 20:1.

The resulting mixture continues upward through an upper portion of the riser 22 until at least two disengaging arms 26 tangentially discharge the mixture of gas and catalyst through openings 28 from a top of the riser 22 into a disengaging vessel 30 that affects separation of the gases from the catalyst. Most of the catalyst discharged from the openings 28 fall downwardly in the disengaging vessel 30 into a bed 32. A transport conduit 34 carries the separated hydrocarbon vapors with entrained catalyst to one or more cyclones 36 in a separator vessel 38. The cyclones 36 separate the spent catalyst from the hydrocarbon vapor stream. A collection chamber 40 gathers the separated hydrocarbon vapor streams from the cyclones 36 for passage as the product effluent to an outlet nozzle 42 and into a downstream fractionation zone (not shown). Reactor cyclone diplegs 44 discharge catalyst from the cyclones 36 into a bed 46. Catalyst from bed 46 passes through ports 48 into the bed 32 in the disengaging vessel 30. Catalyst and adsorbed and/or entrained hydrocarbons pass from the disengaging vessel 30 into a stripping section 50. Catalyst from the openings 28 separated in the disengaging vessel 30 passes directly into the stripping section 50. Thus, entrances for advancing the catalyst into the stripping section 50 include the openings 28 and the ports 48.

Stripping gas, such as steam, enters a lower portion of the stripping section 50 through a distributor 52 and rises countercurrent to a downward flow of the catalyst through the stripping section 50. As the catalyst and the stripping gas are in countercurrent contact, adsorbed and/or entrained hydrocarbons are displaced or stripped from the catalyst and flow upwardly with the stripping gas for recovery by the cyclones 36. The distributor 52 distributes the stripping gas around the circumference of the stripping section 50. To facilitate hydrocarbon stripping from the catalyst, a structured packing 54 comprising a plurality of formed strips 56 (e.g. ribbons or strips made from formed metal sheet, metal plate, and/or the like) are arranged in the stripping section 50.

The spent catalyst is removed from the stripping section 50 and is passed through a port 58. A spent catalyst standpipe 60 carries the spent catalyst to the regenerator 14. The catalyst is regenerated in the regenerator 14 as is well known in the art and is sent back to the riser 22 through the regenerated catalyst standpipe 16.

Figure 2:
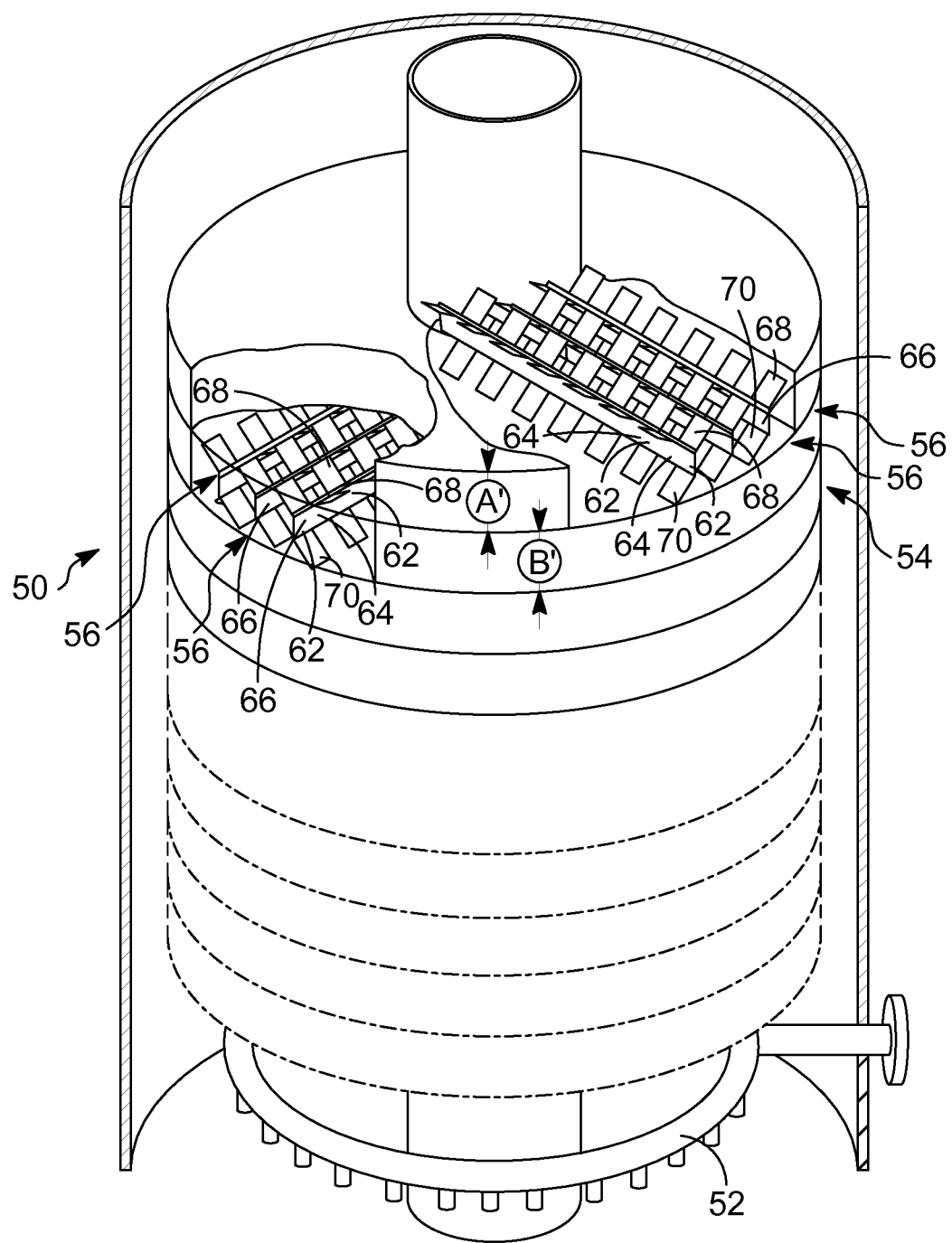
FIG. 2 is an enlarged partial perspective view of structured packing in the stripper section of FIG. 1.

Referring to FIG. 2, a partial perspective view of the stripper section 50 in accordance with an exemplary embodiment is provided. Disposed in the stripper section 50 is the structured packing 54 that includes the formed strips 56. As illustrated, each of the formed strips 56 comprises alternating segments 62 and 64 that together define a vertical element 66 for the given formed strip 56. Each of the alternating segments 62 and 64 have an upper sloping element 68 (e.g. upper baffle or upper baffle plate) and a lower sloping element 70 (e.g. lower baffle or lower baffle plate) that extend in opposite directions and at an incline to a corresponding vertical element 66. The upper sloping elements 68 and independently the lower sloping elements 70 of the alternating segments 62 and 64 extend in alternating directions that are angular to each other. Adjacent formed strips 56 are arranged together in an array to define a plurality of layers including layers A' and B'. As illustrated, the upper and lower sloping elements 68 and 70 of a given segment of the alternating segments 62 and 64 are substantially parallel to each other, and the vertical elements 66 in the same layer A' and B' are arranged substantially parallel. The layers A' and B' are stacked on top of each other in the stripping section 50 and may be oriented differently, such as perpendicular to each other as illustrated or otherwise. As configured, the vertical elements 66, and the upper and lower sloping elements 68 and 70 obstruct the passage of stripping gas and catalyst and openings are formed between the alternating positions of the upper and lower sloping elements 68 and 70, allowing for side to side and limited vertical passage of stripping vapor and catalyst through the structured packing 54 to define a network of torturous pathways.

Figure 3:
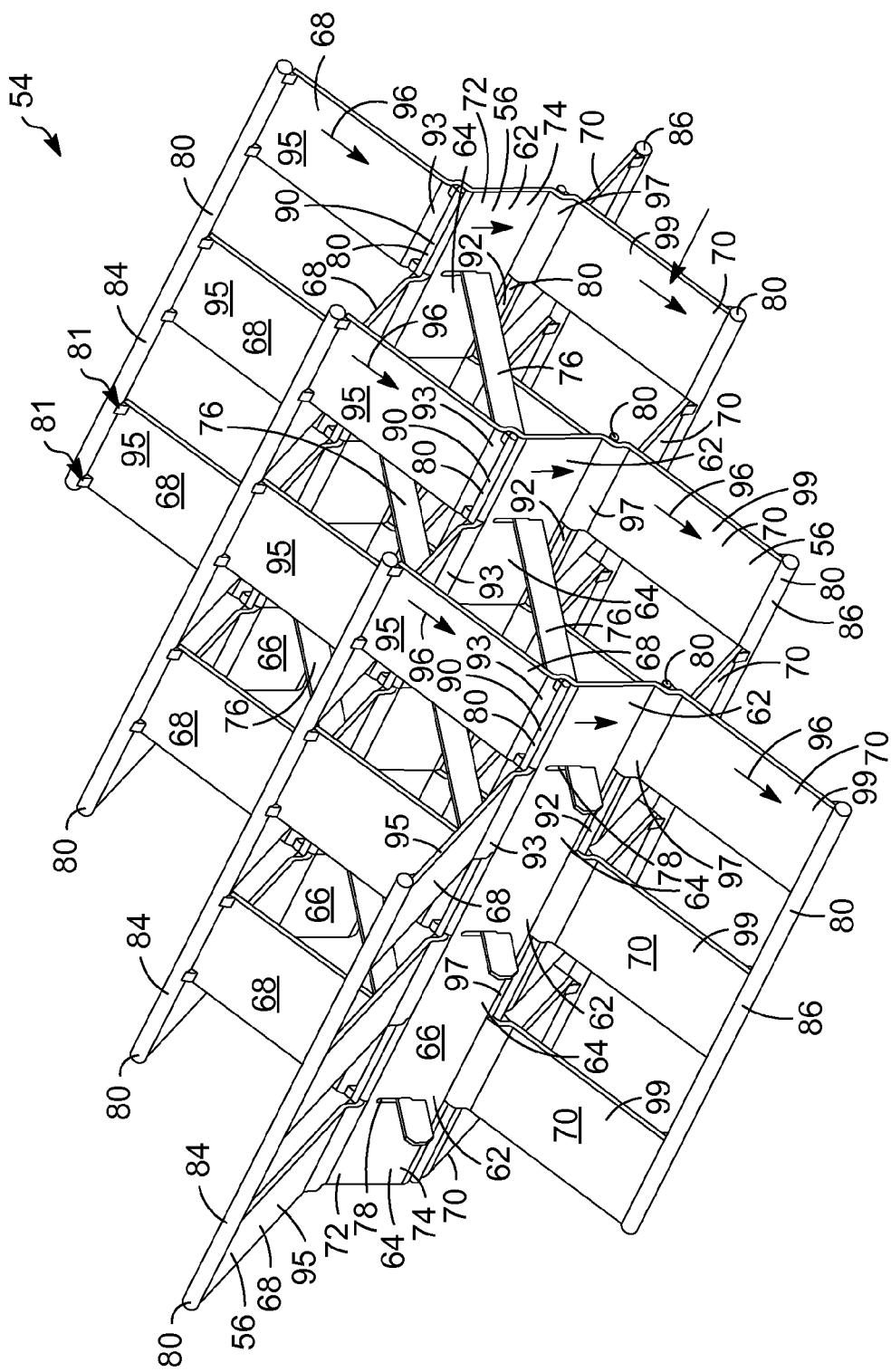
FIG. 3 is a partial perspective view of multiple segments of structured packing illustrated in FIG. 2.

Referring to FIG. 3, a partial perspective view of the structured packing 54 including multiple alternating segments 62 and 64 of three formed strips 56 in accordance with an exemplary embodiment is provided. The upper sloping elements 68 of adjacent segments of the alternating segments 62 and 64 extend from an upper portion 72 of a given vertical element 66, and can have different configurations that are angular to each other. The lower sloping elements 70 of adjacent segments of the alternating segments 62 and 64 extend from a lower portion 74 of a given vertical element 66 and can have different configurations that are angular to each other. Tie rods 76 extend through apertures 78 formed in the vertical elements 66 to secure the formed strips 56 in an array.

Figure 4:
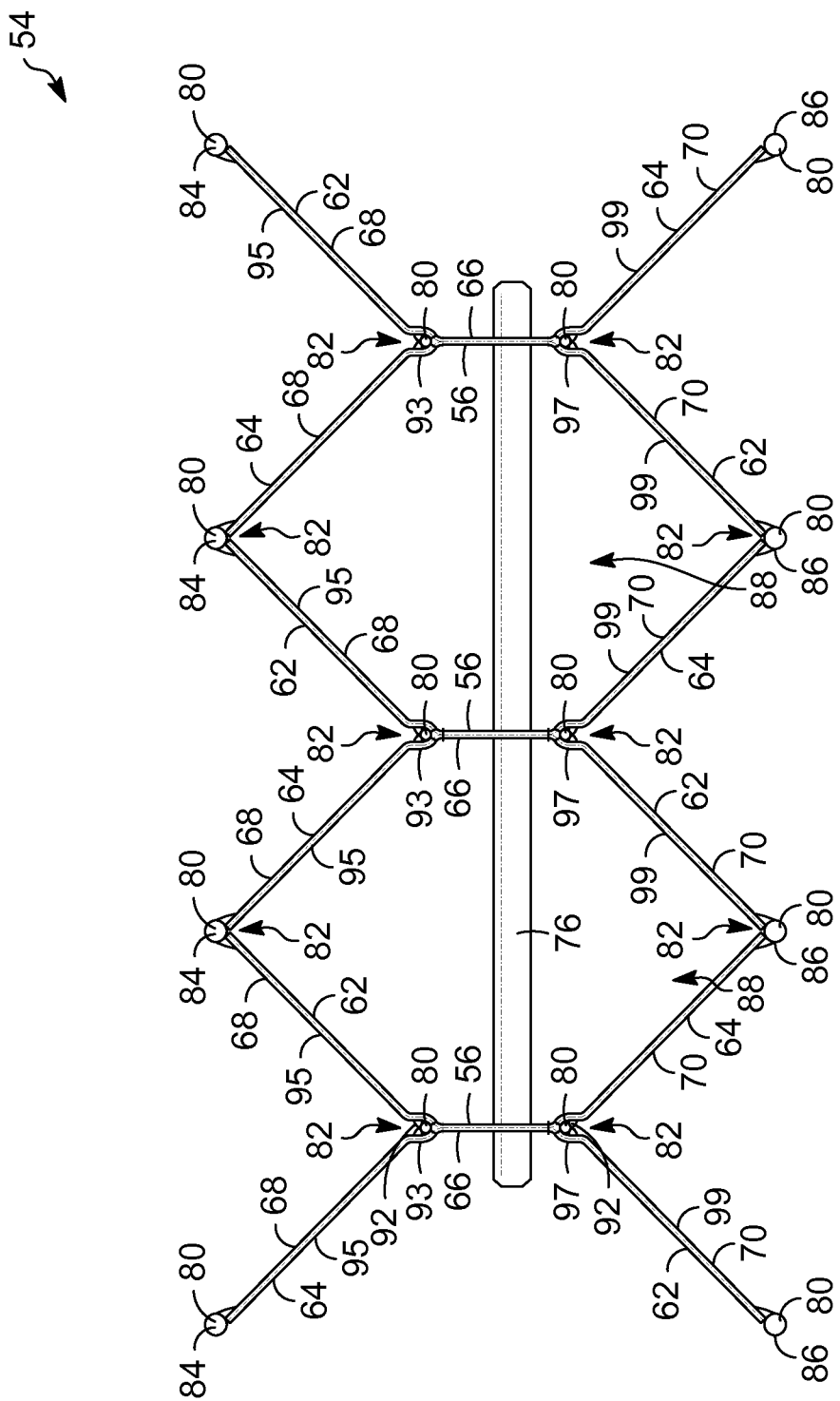
FIG. 4 is a partial longitudinal side view of the structured packing illustrated in FIG. 3.

Referring also to FIG. 4, a longitudinal side view of the adjacent formed strips 56 illustrated in FIG. 3 is provided. A plurality of reinforcing rods 80 are secured to the upper and lower sloping elements 68 and 70. The reinforcing rods 80 can have a circular cross-section as shown with the same or different diameters or any other cross-section suitable for providing structure. The reinforcing rods 80 help to stabilize the positions of the formed strips 56 (e.g. when the formed strips 56 are stacked in layers A' and B') including stabilizing the inclined positions of the upper and lower sloping elements 68 and 70.

In particular and as illustrated, the upper sloping elements 68 each have a lower channel portion 93 and an inclined sheet portion 95 that extends generally upward from the lower channel portion 93. The lower sloping elements 70 each have an upper channel portion 97 and an inclined sheet portion 99 that extends generally downward from the upper channel portion 97. Troughs 82 are defined by the upper and lower sloping elements 68 and 70 of adjacent segments of the alternating segments 62 and 64. In the troughs 82 of a given formed strip 56, upper and lower crotch reinforcing rods 90 and 92 are positioned and secured along the lower and upper channel portions 93 and 97, respectively, of adjacent segments of the alternating segments 62 and 64. Above and below the distal edges of the upper and lower sloping elements 68 and 70 opposite the troughs 82, upper and lower block reinforcing rods 84 and 86 are positioned and secured to the upper and lower sloping elements 68 and 70, respectively, of alternate segments of the alternating segments 62 and 64 of the adjacent formed strips 56 to form hexagonal block configuration 88.

The inventors have found that by positioning the upper crotch reinforcing rods 90 through the channel spaces of the lower channel portions 93 of the upper sloping elements 68, the upper crotch reinforcing rods 90 are recessed relative to the inclined sheet portions 95 such that catalyst flowing down the upper sloping elements 68 (indicated by single headed arrow 96) readily passes over the upper crotch reinforcing rods 90 and descends towards the lower sloping elements 70. Moreover, by positioning the lower block reinforcing rods 86 below the distal edges, e.g., opposite the troughs 82, of the lower sloping elements 70, the catalyst readily passes over the lower sloping elements 70 (indicated by single headed arrow 96). Additionally, by positioning the lower crotch reinforcing rods 92 through the channel spaces of the upper channel portions 97 of the lower sloping elements 70 and positioning the upper block reinforcing rods 84 above the distal edges, e.g., opposite the troughs 82, of the upper sloping elements 68, the inventors have found that a layer(s) of structured packing is easier to fabricate because the upper and lower halves of the layer(s) are substantially symmetrical.

Accordingly, apparatuses and processes for stripping gaseous hydrocarbons from particulate material have been described. Unlike the prior art, the exemplary embodiments taught herein provide a structured packing that is disposed in a stripping section of a vessel. The structured packing is configured for passage of particles that contain hydrocarbons and a stripping vapor in countercurrent contacting flow to remove at least a portion of the hydrocarbons with the stripping vapor to form stripped particles. The structured packing comprises a plurality of sloping elements. Each of the sloping elements has a lower channel portion and an inclined sheet portion that extends generally upward from the lower channel portions. The sloping elements are coupled to a reinforcing rod(s) along the lower channel portions. As the particles descend through the structured packing, the particles contact and advance down the sloping elements towards the reinforcing rod(s). The reinforcing rod(s), which is disposed through the channel spaces of the lower channel portions, is recessed relative to the inclined sheet portion(s) of the sloping elements such that the particles readily pass over the reinforcing rod(s).

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

The invention claimed is:

1. An apparatus for stripping gaseous hydrocarbons from particulate material, the apparatus comprising:
    a structured packing configured for passage of a stripping vapor and particles that contain hydrocarbons in countercurrent contacting flow to remove at least a portion of the hydrocarbons with the stripping vapor to form stripped particles, the structured packing comprising:
    a first formed strip comprising a sloping element that has a lower channel portion and an inclined sheet portion that extends generally upward from the lower channel portion; and
    a reinforcing rod disposed along the lower channel portion and recessed relative to the sloping element.

2. The apparatus of claim 1, wherein the first formed strip comprises first alternating segments that define a first vertical element that has a first upper portion and a first lower portion, wherein the first alternating segments each have a first upper sloping element extending from the first upper portion at a first incline to the first vertical element, wherein the first upper sloping elements of adjacent segments of the first alternating segments are angular to each other, wherein the first upper sloping elements each have a first lower channel portion and a first inclined sheet portion that extends generally upward from the first lower channel portion, wherein the reinforcing rod is a first upper reinforcing rod that overlies the first upper portion of the first vertical element and that is disposed along the first lower channel portions, and wherein one of the first upper sloping elements is the sloping element, and one of the first lower channel portions and one of the first incline sheet portions are the lower channel portion and the inclined sheet portion, respectively.

3. The apparatus of claim 2, wherein the first lower channel portions are directly coupled to the first upper portion of the first vertical element.

4. The apparatus of claim 2, wherein the first upper reinforcing rod is coupled to the first lower channel portions.

5. The apparatus of claim 2, wherein the first alternating segments each have a first lower sloping element extending from the first lower portion at a second incline to the first vertical element, wherein the first lower sloping elements of adjacent segments of the first alternating segments are angular to each other.

6. The apparatus of claim 5, wherein the first lower sloping elements each have a first upper channel portion and a second inclined sheet portion that extends generally downward from the first upper channel portion, wherein the apparatus further comprises:
    a first lower reinforcing rod underlying the first lower portion of the first vertical element and disposed along the first upper channel portions.

7. The apparatus of claim 5, wherein the first alternating segments each have the first upper sloping element and the first lower sloping element extending from the first vertical element in opposite directions.

8. The apparatus of claim 5, further comprising a second lower reinforcing rod disposed adjacent to the first lower sloping elements of alternate segments of the first alternating segments distally from the first vertical element.

9. The apparatus of claim 8, further comprising
    a second formed strip disposed adjacent to the first formed strip and comprising second alternating segments that define a second vertical element that has a second upper portion and a second lower portion, wherein the second alternating segments each have a second upper sloping element and a second lower sloping element extending from the second upper portion and the second lower portion, respectively, at a third incline to the second vertical element, and wherein the second lower reinforcing rod is coupled to the first and second lower sloping elements of a first plurality of segments of the first and second alternating segments distally from the first and second vertical elements, respectively.

10. The apparatus of claim 9, wherein the first and second lower sloping elements of the first plurality of segments each have a first lower-most edge, and wherein the second lower reinforcing rod is disposed under and along the first lower-most edges of the first and second lower sloping elements.

11. The apparatus of claim 9, further comprising:
    a tie bar disposed through the first and second vertical elements to secure the first and second formed strips in an array.

12. The apparatus of claim 9, and wherein the second upper sloping elements each have a second lower channel portion and a second inclined sheet portion that extends generally upward from the second lower channel portion, and wherein the apparatus further comprises:
    a second upper reinforcing rod overlying the second upper portion of the second vertical element and disposed along the second lower channel portions.

13. The apparatus of claim 9, further comprising a third upper reinforcing rod coupled to the first and second upper sloping elements of a second plurality of segments of the first and second alternating segments distally from the first and second vertical elements, respectively.

14. The apparatus of claim 13, wherein the first and second upper sloping elements of the second plurality of segments each have a first upper-most edge, and wherein the third upper reinforcing rod is disposed over and along the first upper-most edges of the first and second upper sloping elements.

15. A process for stripping gaseous hydrocarbons from particulate material, the process comprising the steps of:
    contacting particles containing hydrocarbons with a stripping vapor in countercurrent flow to remove at least a portion of the hydrocarbons with the stripping vapor to form stripped particles, wherein contacting the particles includes:
    advancing the particles down a sloping element of a structured packing toward a reinforcing rod that is disposed along a lower channel portion of the sloping element and recessed relative to the sloping element;
    a first formed strip comprising a sloping element that has a lower channel portion and an inclined sheet portion that extends generally upward from the lower channel portion; and
    advancing the particles over the reinforcing rod; and contacting the particles with the stripping vapor that is rising up adjacent to the lower channel portion.

* * * * *